Oct. 6, 1931.  C. C. SPREEN  1,826,373
SEAL FOR JOURNAL BEARINGS
Filed Dec. 30, 1926
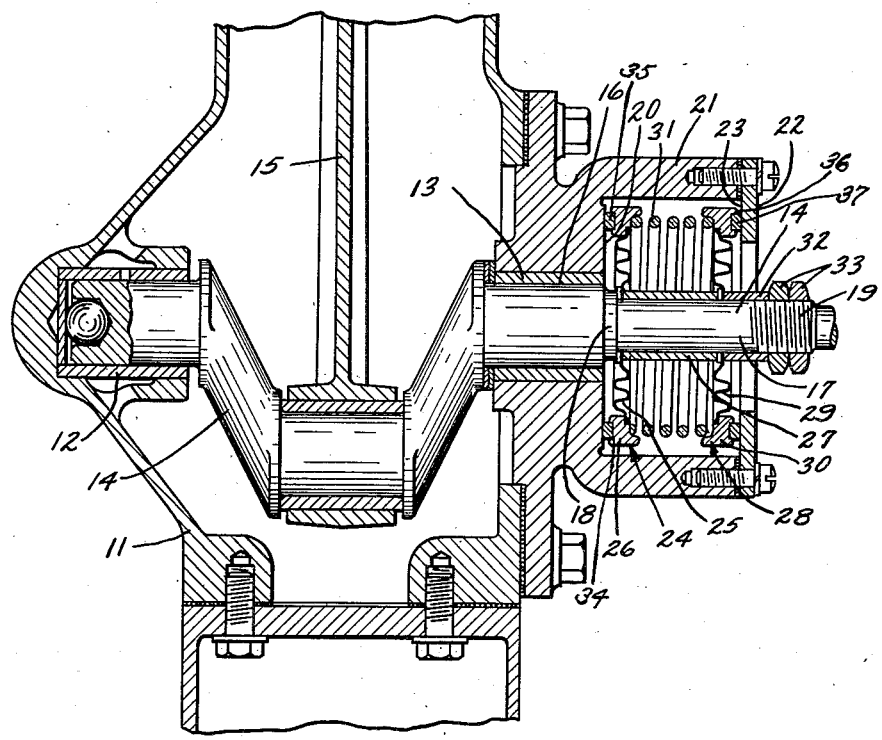
Charles C. Spreen
Inventor
By Smith and Freeman
Attorneys Patented Oct. 6, 1931

1,826,373

UNITED STATES PATENT OFFICE

CHARLES C. SPREEN, OF DETROIT, MICHIGAN

SEAL FOR JOURNAL BEARINGS

Application filed December 30, 1926. Serial No. 157,937.

My invention relates to gas tight seals for journal bearings, and particularly to means for sealing the drive shaft aperture in the casing of a refrigerant compressor, and the principal object of my invention is to provide new and improved means for this purpose. In the drawing accompanying this specification and forming a part of this application I have shown, for the purpose of illustration, one form which my invention may assume, and in this drawing the single figure is a fragmentary central vertical section through a compressor showing the embodiment of my invention herein disclosed.

In the embodiment of my invention herein shown the lower portion of the compressor casing 11 is provided with a closed bearing 12 and an open-end bearing 13 arranged to jointly support a crank shaft 14 which receives between the bearings 12 and 13 the usual connecting rod 15. The crank shaft projects beyond the open-end bearing 13 through a suitable aperture 16 in the casing 11, and is provided exteriorly of the casing 11 with a reduced extension 17 forming an annular shoulder 18, which reduced portion is provided with a screw-threaded portion 19, and adapted to receive a suitable driving connection, not shown; and the casing 11 is provided with an annular casing seat 20 surrounding the aperture 16 and the crank shaft 14 passing therethrough, and with an annular extension 21 carrying a face plate 22 provided with a second casing seat 23 also surrounding the aperture 16 and the crank shaft 14 passing therethrough.

Closing the aperture 16, particularly to prevent both the egress of refrigerant and the ingress of moisture, is a seal 24 herein shown as comprising a generally radial flexible annular diaphragm 25 corrugated to increase its flexibility, having its outer periphery attached to a base 26 adapted to be held in rotary sealing engagement with the casing seat 20, and having its inner periphery sealed to the crank shaft shoulder 18 by means of an annular sleeve 27 embracing the crank shaft extension 17 with the inner periphery of the diaphragm 25 disposed between itself and the shoulder 18. The base 26 is provided with an annular groove 34 on the side facing the casing seat 20. The groove 34 has set into it a ring 35 of bearing metal. The bearing metal is preferably of the self lubricating type which will maintain a tight joint without corrosion or sticking.

Closing the aperture between the base 26 and the casing seat 20, particularly to further prevent both the egress of refrigerant and the ingress of moisture, is a seal 28 herein shown as comprising a generally radial flexible annular diaphragm 29 corrugated to increase its flexibility, having its outer periphery attached with a base 30 rotatably sealed to the second casing seat 23 by means of a spring 31 compressed between the bases 26 and 30, and having its inner periphery held in fixed sealing engagement with the shaft extension 17 by means of a second sleeve 32 carried on the shaft 14 held by nuts 33 engaging the screw-threaded portion 19 of the extension 17 in position clamping the inner edge of the diaphragm 29 between itself and the first sleeve 27, and holding the sleeve 27 in position clamping the inner edge of the first diaphragm 25 between itself and the shoulder 18. The base 30 is provided with an annular groove 36 on the side facing the casing seat 23. The groove 36 has set therein a ring 37 preferably formed of self lubricating metal which will not stick and will be noiseless in operation.

From the above description it will be obvious to those skilled in the art that I have provided a seal rotating with the crank shaft and doubly sealing the shaft aperture in the casing and under these circumstances it will be apparent to those skilled in the art that the embodiment of my invention herein shown accomplishes at least the principal object of my invention.

At the same time, it will also be obvious to those skilled in the art that the embodiment of my invention herein shown and described may be variously changed and modified without departing from the spirit of my invention or sacrificing the advantages thereof, and it will therefore be understood that the disclosure herein is illustrative only, and that my invention is not limited thereto.

I claim:

In a journal bearing seal, the combination of a casing, bearings within said casing, a shaft journaled within said bearings, spaced resilient disks sealed to said shaft, annular members secured to said disks, bearing rings attached to the outer faces of said annular members and bearing upon said casing, and a spring disposed intermediate said annular members and adapted to seat thereon for exerting a thrust thereon.

In testimony whereof I hereunto affix my signature.

CHARLES C. SPREEN.